United States Patent
Catanzaro

(10) Patent No.: US 9,200,783 B2
(45) Date of Patent: Dec. 1, 2015

(54) PROJECTOR ENCASEMENT

(71) Applicant: Frank Cosimo Catanzaro, Trot, IL (US)

(72) Inventor: Frank Cosimo Catanzaro, Trot, IL (US)

( * ) Notice: Subject to any disclaimer, the term of this patent is extended or adjusted under 35 U.S.C. 154(b) by 209 days.

(21) Appl. No.: 14/024,599

(22) Filed: Sep. 11, 2013

(65) Prior Publication Data

US 2014/0071682 A1    Mar. 13, 2014

Related U.S. Application Data

(60) Provisional application No. 61/699,830, filed on Sep. 11, 2012.

(51) Int. Cl.
| | |
|---|---|
| G02B 27/20 | (2006.01) |
| F21V 15/01 | (2006.01) |
| H05K 5/02 | (2006.01) |
| G03B 17/08 | (2006.01) |

(52) U.S. Cl.
CPC ............... *F21V 15/01* (2013.01); *G03B 17/08* (2013.01); *H05K 5/0213* (2013.01)

(58) Field of Classification Search
CPC ....... F21V 15/01; G03B 17/08; H05K 5/0213
USPC .................................... 362/259, 217.01, 371
See application file for complete search history.

(56) References Cited

U.S. PATENT DOCUMENTS

| | | | | |
|---|---|---|---|---|
| 5,297,004 A | * | 3/1994 | Mazura .................... | 361/690 |
| 2010/0259941 A1 | * | 10/2010 | Brennan .................. | 362/362 |

* cited by examiner

*Primary Examiner* — Via Patel

(57) ABSTRACT

A water proof encasement for an electronic device, such as an electronic laser is used for DJ lighting, holiday lighting, video equipment, and the like. The water proof encasement of the present invention allows a user to install a laser to place outside in the elements to shine on, for example, the outside of a house for holiday lighting.

9 Claims, 4 Drawing Sheets

PROJECTOR ENCASEMENT

CROSS-REFERENCE TO RELATED APPLICATION

This application claims the benefit of priority of U.S. provisional application No. 61/699,830, filed Sep. 11, 2012, the contents of which are herein incorporated by reference.

BACKGROUND OF THE INVENTION

The present invention relates to encasements and, more particularly, to an encasement that allows electronic components, such as electronic DJ lighting, holiday lighting, video equipment, and the like, to be protected from the weather and elements in order to keep the electronic components in proper working order.

Often, a user needs to install outdoor electronic equipment, such as lighting, video cameras, or the like. The equipment is often not, itself, water proof and, therefore, can be damaged from being left out in the weather.

As can be seen, there is a need for an enclosure to contain electronic equipment so that it can withstand outdoor weather conditions.

SUMMARY OF THE INVENTION

In one aspect of the present invention, an encasement for an electronic device comprises a first elongated tubular member; a translucent cover on one end of the first tubular member; a rear covering on an opposite end of the first tubular member; a first piece of angle and a second piece of angle attached to the bottom of the first elongated tubular member; and a second elongated tubular member disposed between the first and second pieces of angle and pivotably attached thereto.

In another aspect of the present invention, an encasement for an electronic device comprises a first elongated tubular member; a translucent cover on one end of the first tubular member; a rear covering having a plurality of ventilation holes formed therethrough, the rear covering removably disposed on an opposite end of the first tubular member; a first piece of angle and a second piece of angle attached to the bottom of the first elongated tubular member; and a second elongated tubular member disposed between the first and second pieces of angle and pivotably attached thereto with a bolt.

In a further aspect of the present invention, a method for projecting a decoration on a surface comprises encasing a projector inside an encasement, the encasement comprising a first elongated tubular member, a translucent cover on one end of the first tubular member, a rear covering on an opposite end of the first tubular member, a first piece of angle and a second piece of angle attached to the bottom of the first elongated tubular member, and a second elongated tubular member disposed between the first and second pieces of angle and pivotably attached thereto; delivering power to the projector; and directing a laser display out of the translucent cover to deliver the decoration.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a water proof encasement for an electronic device, such as an electronic laser used for DJ lighting, holiday lighting, video equipment, and the like. The water proof encasement of the present invention allows a user to install a laser to place outside in the elements to shine on, for example, the outside of a house for holiday lighting.

Figure 1:
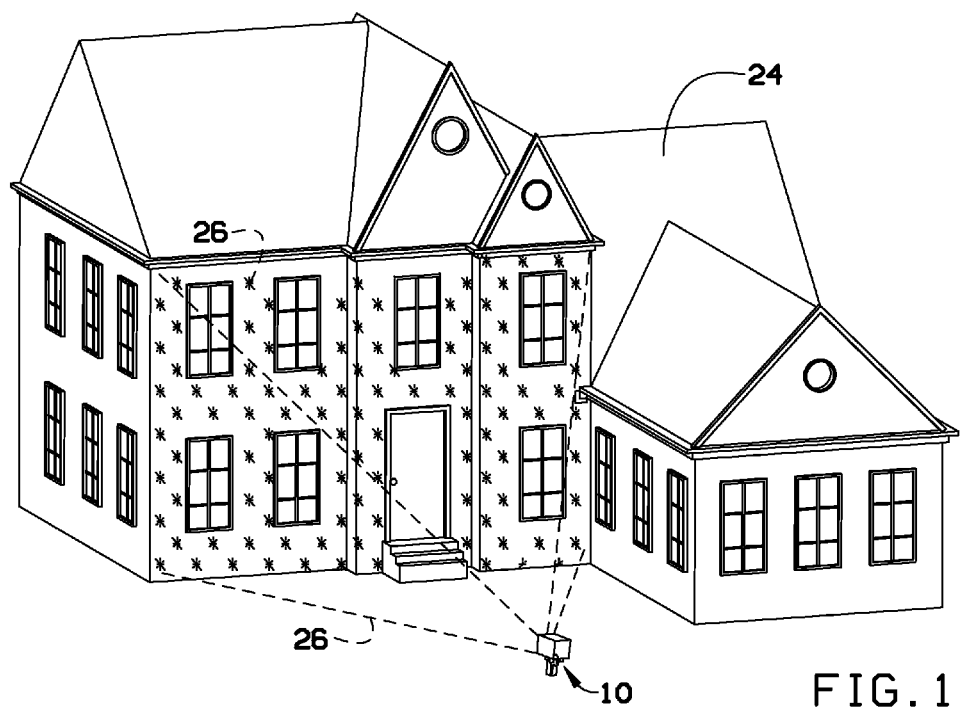
FIG. 1 is a perspective view of a house illuminated with lighting emitted from a projector encasement according to an exemplary embodiment of the present invention.
Figure 2:
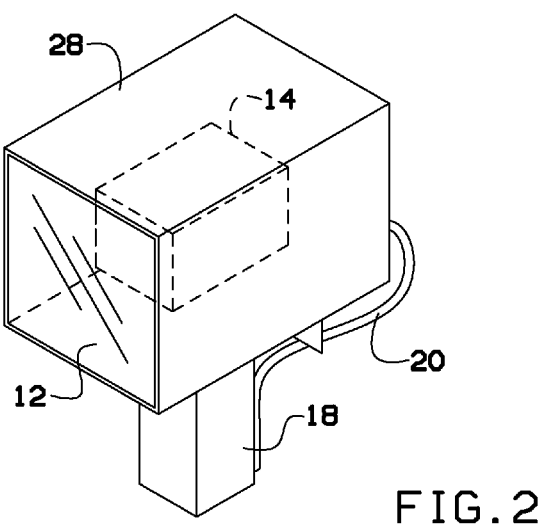
FIG. 2 is a front perspective view of the projector encasement of FIG. 1.
Figure 3:
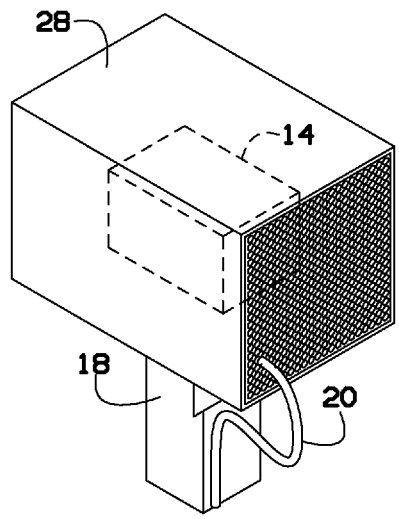
FIG. 3 is a rear perspective view of the projector encasement of FIG. 1.
Figure 4:
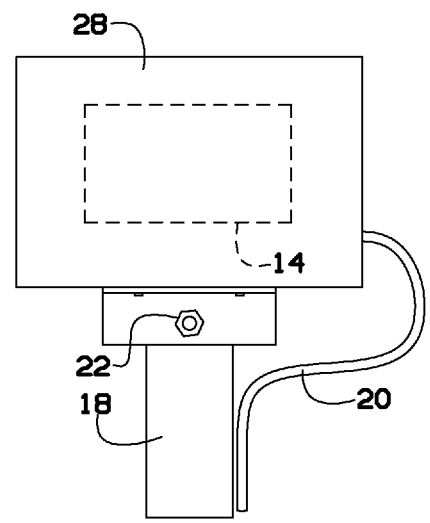
FIG. 4 is a side view of the projector encasement of FIG. 1.
Figure 5:
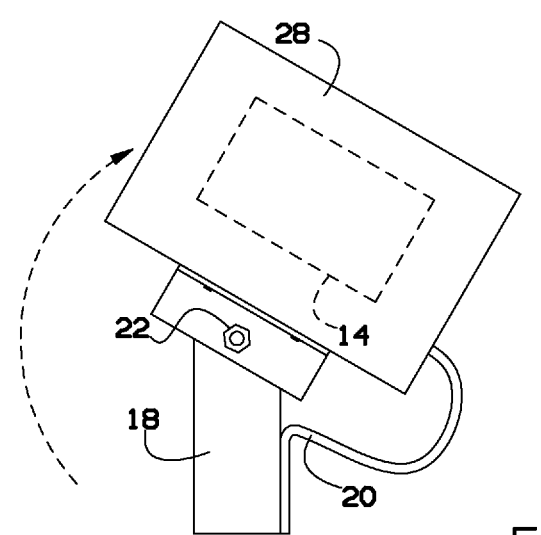
FIG. 5 is a side view of the projector encasement of FIG. 1, illustrating pivoting action thereof.
Figure 6:
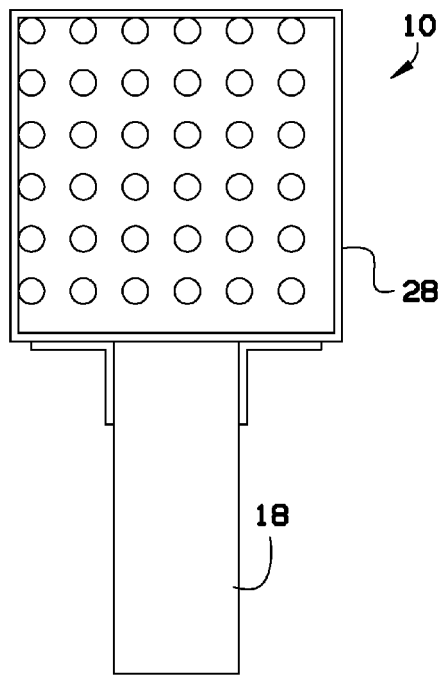
FIG. 6 is a front view of the projector encasement of FIG. 1.
Figure 7:
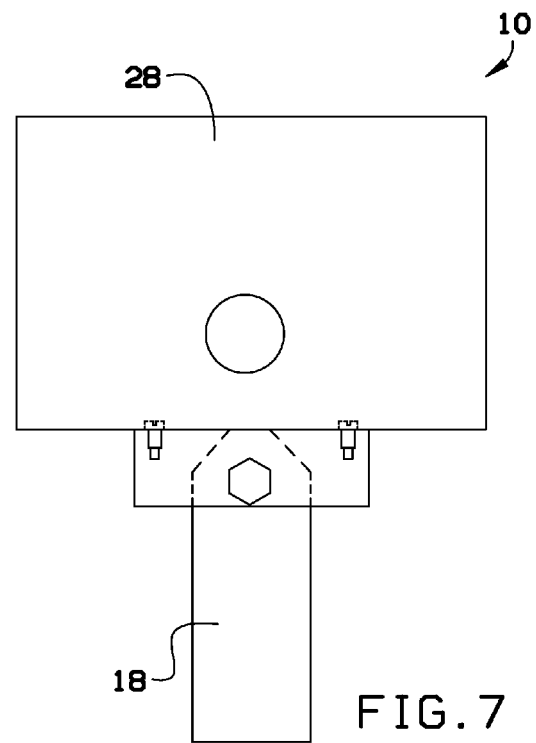
FIG. 7 is a side view of the projector encasement of FIG. 1.
Figure 8:
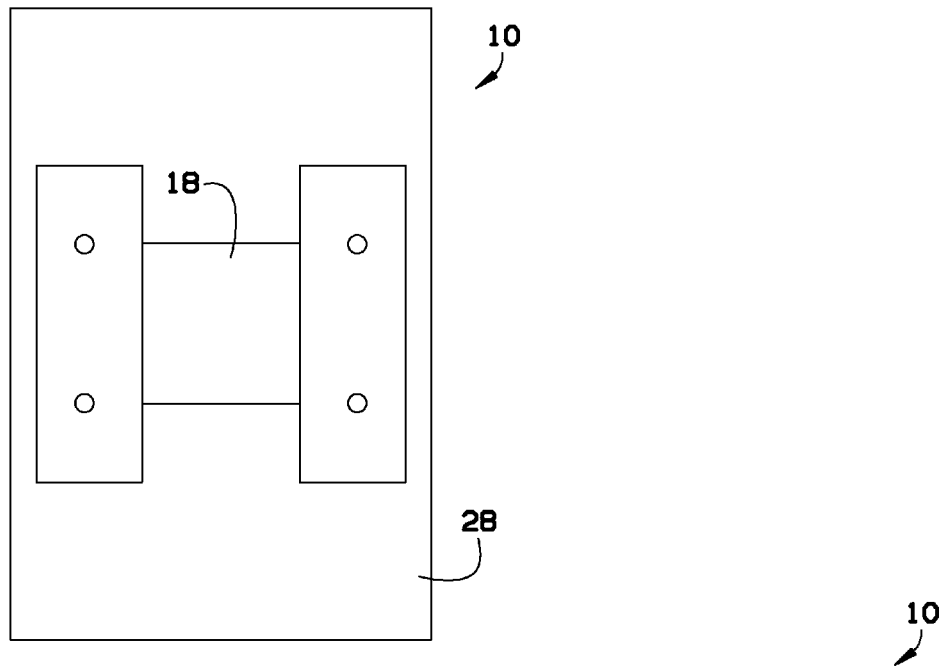
FIG. 8 bottom view of the projector encasement of FIG. 1.
Figure 9:
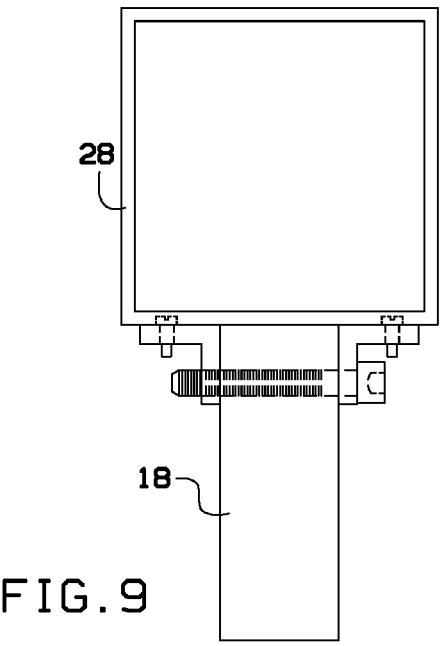
FIG. 9 back view of the projector encasement of FIG. 1.

Referring now to FIGS. 1 through 9, a main body 28 of an encasement 10 can be made from various materials, such as a vinyl fencing post, typically a 4-by-4 vinyl fencing post cut from about 4 to about 8 inches long, typically about 6 inches long. An elevation post 18, such as a 1.5 inch vinyl post, can fit between rails 11, such as two 1-inch vinyl angle rails, cut about 3-inches long and attached to the bottom of the main body 28 (one side of the 4-by-4 vinyl fencing post). The vinyl angle rails 11 can attach to the main body 28 by various means, such as rivets, bolts, adhesive, or the like. A bolt 22, such as a ⅝ inch bolt, can pass through the vinyl angle rails 11 that depend from the main body 28, as well as the 1.5 inch vinyl post 18, to attach the 1.5 inch vinyl post 18 to the vinyl angle rails 11, and thus, to the main body 28.

A clear covering 12, such as clear plastic, such as Plexiglas, or glass, can cover the front opening of the main body 28. A rear covering 21 can be made of various materials, typically of a plastic, such as the same material as the main body 28. The rear covering 21 can have pre-drilled holes formed therein for ventilation and can be disposed over the back opening of the main body 28. This rear covering 21 can be attached to the main body 28 by various means, such as with a hinge to allow access inside the main body 28.

The electronic device 14, such as an electronic laser, can be disposed inside the main body 28. Holes can be drilled in the sides of the main body 28 to secure the electronic device 14 in place with bolts (not shown) passing through the holes. A power cord 20 can run along the elevation post 18 and into the encasement 10, typically through the rear covering 21.

The water proof encasement 10 can include a piece, about 12 inches long, of 1-inch vinyl post, having an angled cut, such as a 45 degree cut, in one end to form a point. The 1-inch vinyl post can be inserted into a desired location, such as in the ground in front of a house, with at least about 3-4 inches extending above the ground. The 1.5 inch vinyl post that is attached to the main body can slide over the 1-inch vinyl post to place the enclosure in a desired location.

The water proof encasement 10 of the present invention can be used for electronic devices 14 to decorate with a projection 26 on the outside of a home 24 for the holidays, could be used to protect camera equipment to film outside videos or television footage, could be used for wildlife cameras, or the like.

While the above describes a particular size of the encasement, other sizes are contemplated within the scope of the present invention.

It should be understood, of course, that the foregoing relates to exemplary embodiments of the invention and that modifications may be made without departing from the spirit and scope of the invention as set forth in the following claims.

What is claimed is:

1. An encasement for an electronic device, comprising:
   a first elongated tubular member;
   a translucent cover on one end of the first tubular member;
   a rear covering on an opposite end of the first tubular member;
   a first piece of angle and a second piece of angle attached to the bottom of the first elongated tubular member; and
   a second elongated tubular member disposed between the first and second pieces of angle and pivotably attached thereto.

2. The encasement of claim 1, wherein the second elongated tubular member is attached to the first and second pieces of angle with a bolt.

3. The encasement of claim 1, wherein the rear covering is removably disposed on the opposite end of the first tubular member.

4. The encasement of claim 1, wherein the first and second elongated tubular members are plastic.

5. The encasement of claim 1, wherein the rear covering has a plurality of ventilation holes formed therethrough.

6. An encasement for an electronic device, comprising:
   a first elongated tubular member;
   a translucent cover on one end of the first tubular member;
   a rear covering having a plurality of ventilation holes formed therethrough, the rear covering removably disposed on an opposite end of the first tubular member;
   a first piece of angle and a second piece of angle attached to the bottom of the first elongated tubular member; and
   a second elongated tubular member disposed between the first and second pieces of angle and pivotably attached thereto with a bolt.

7. A method for projecting a decoration on a surface, comprising:
   encasing a projector inside an encasement, the encasement comprising a first elongated tubular member, a translucent cover on one end of the first tubular member, a rear covering on an opposite end of the first tubular member, a first piece of angle and a second piece of angle attached to the bottom of the first elongated tubular member, and a second elongated tubular member disposed between the first and second pieces of angle and pivotably attached thereto;
   delivering power to the projector; and
   directing a laser display out of the translucent cover to deliver the decoration.

8. The method of claim 7, wherein the surface is an exterior surface of a home.

9. The method of claim 7, further comprising cooling the projector by allowing air circulate inside the encasement via ventilation holes formed in the rear covering.

* * * * *